United States Patent [19]
Bultemann

[11] 3,815,340
[45] June 11, 1974

[54] DEVICE FOR SEPARATING MIXTURES OF GASEOUS AND/OR VAPOROUS SUBSTANCES, ESPECIALLY FOR SEPARATION OF A CARRIER GAS IN DEVICES FOR GASCHROMATOGRAPHY

[76] Inventor: Hans-Joachim Bultemann, Walliser Strasse 94, 2800 Bremen, Germany

[22] Filed: Sept. 29, 1971

[21] Appl. No.: 184,859

[30] Foreign Application Priority Data
Oct. 1, 1970  Germany............................ 2048221

[52] U.S. Cl............................ 55/392, 55/17, 55/197
[51] Int. Cl............................................ B01d 53/22
[58] Field of Search......... 55/17, 67, 197, 270, 386, 55/197, 434, 432, 392

[56] References Cited
UNITED STATES PATENTS
3,298,195  1/1967  Raskhodoff........................... 98/36
3,362,131  1/1968  Becker................................. 55/17
3,678,656  7/1972  Brunee et al. ..................... 55/197

FOREIGN PATENTS OR APPLICATIONS
897,842  6/1944  France................................ 55/434

Primary Examiner—Bernard Nozick
Attorney, Agent, or Firm—David Wolf

[57] ABSTRACT

Means for separating a carrier gas and vaporous substances for use in gaschromatography. The mixture of gas and vaporous substances is introduced into a separating chamber. The chamber has an inlet for introduction of the gaseous and vaporous mixture, a first exit for molecular flow and a second exit for viscous flow. The first exit has a slit width that decreases from the inlet towards the second exit.

4 Claims, 4 Drawing Figures

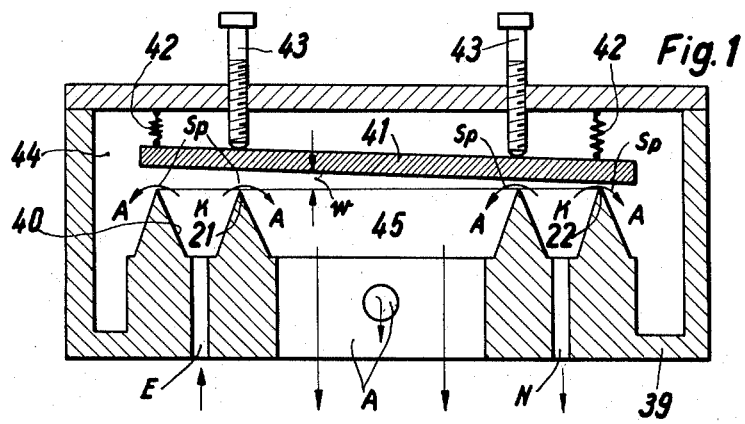
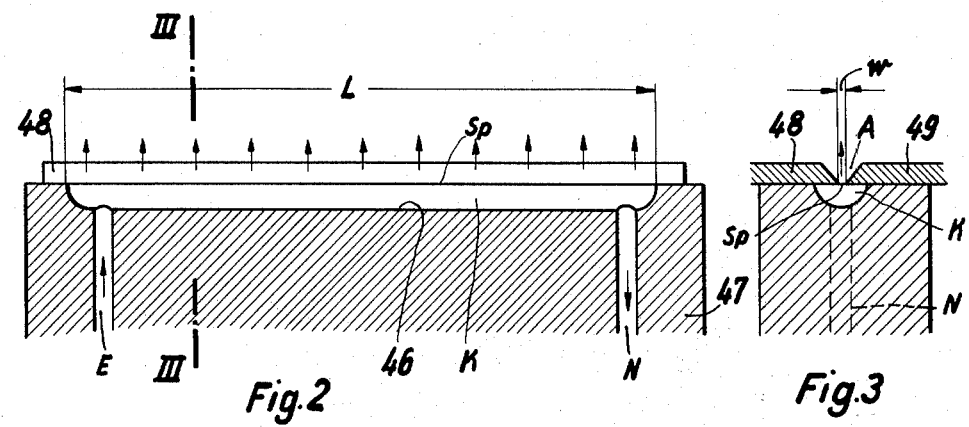
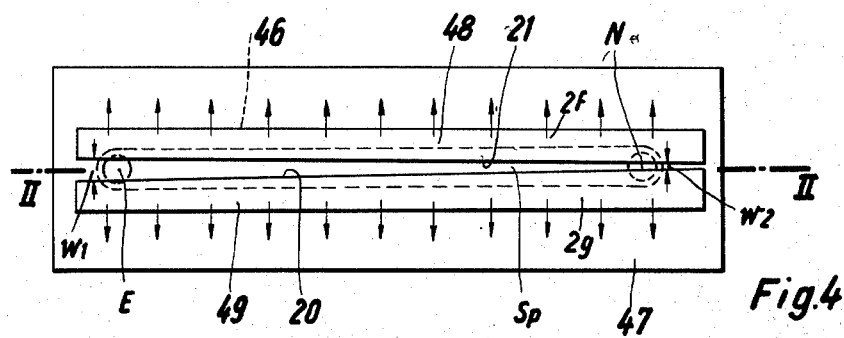

DEVICE FOR SEPARATING MIXTURES OF GASEOUS AND/OR VAPOROUS SUBSTANCES, ESPECIALLY FOR SEPARATION OF A CARRIER GAS IN DEVICES FOR GASCHROMATOGRAPHY

The invention relates to a device for separating mixtures of gaseous and/or vaporous substances which comprises a separating chamber for said mixture provided with an inlet for viscous flow, a first exit for molecular flow having the form of an elongated slit wherein the slit width preferably is adjustable, and a second exit for viscous flow, especially for separation of a carrier gas in devices for gaschromatography. See U.S. patent 3,678,656.

The invention is based on the observation that the degree of separation is changed considerably by using instead of an even slit width a slit width changing over the length of the separating chamber. According to the invention an essential improvement of the separating effect may be obtained by providing a slit width of said first exit diminishing from said inlet towards said second exit. The improvement of the separating effect by using a diminishing slit width may be accounted for by providing a decrease of the effect of taking along particles in the viscous flow from the inlet towards the second exit by said changing slit width.

For a better understanding of the invention and to show how the same may be carried into effect, reference will now be made, by way of example, to the accompanying drawings, in which:

FIG. 1 shows a sectional view of a separating device according to the invention with a circular separating chamber, FIG. 2 shows a separating device according to the invention with a straight-lined separating chamber in a sectional view along line 2—2 of FIG. 3, FIG. 3 shows a sectional view along line 3—3 of FIG. 2 and FIG. 4 shows a plan view of FIG. 2.

The first embodiment shows a device for separating mixtures of gaseous and/or vaporous substances comprising a separating chamber K in the form of an annular trough 40 within a basic body 39 the opening of which is covered by a platelike cover 41 up to a first exit Sp in the form of four narrow slits between the underside of said cover 41 and the edge-like rims 21,22 of trough 40. The cover 41 is kept in a free distance above said two rims 21,22 of trough 40 by springs 42 in order to from the slits Sp. Said free distance is adjustable by adjusting screws 43. According to the invention the cover 41 is adjusted so that the width of the two slits 21,22 decreases from the left side with the inlet E up to the right side with a second exit N for viscous flow. Compared with the conventional even and constant slit width $w$, said decreasing slit width of the first exit Sp ensures a better separating effect. The slit width $w$ is so small all over the length of the first exit between inlet E and second exit N that a molecular flow is maintained everywhere. The first exit A consists of said slit Sp, adjoining outside and inside chamber 44,45, a connecting channel and a central opening.

In the embodiment of FIGS. 2 to 4 the separating chamber K is formed by a straight-line trough 46 within a basic body 47 which is provided with an inlet E at one end and a second exit N at the other end of the trough 46. The first exit Sp is formed by a bipartite platelike covering body 48,49 lying upon the face-grinded and polished upper surface of said basic body 47 and having two edges 21,22 facing one another within the plane of said upper surface. A slit width $w$ decreasing from inlet E to second exit N is obtained by adjusting the two edges 21,22 so that they are inclined to one another.

Also in this case the slit width $w$ is small enough all over the length of the first exit Sp to ensure a molecular flow everywhere between inlet E and second exit N. In the drawing the slit width is shown extremely large. In reality the length L of trough K is for instance 200 mm, the width W of trough K is 0,5 mm, the width $w_1$ of slit Sp at inlet E is 10 $\mu$m and the width $w_2$ of slit Sp at the second exit N is merely 5 $\mu$m.

It will be appreciated that modifications may be made to the above-described embodiments. In FIG. 1 the first exit consists of four semicircular slits whereas in FIGS. 2 to 4 the first exit is formed by a single straight-line slit. Of course, the first exit could also consist of two or more parallel straight-line slits.

LIST OF REFERENCES

| | |
|---|---|
| 20, 21 | edges |
| 39 | basic body |
| 40 | trough |
| 41 | covering body, cover |
| 42 | springs |
| 43 | adjusting screws |
| 44 | outside chamber |
| 45 | inside chamber |
| 46 | trough |
| 47 | basic body |
| 48, 49 | covering body |
| E | inlet |
| K | separating chamber |
| N | second exit |
| Sp | second exit |
| W | width |
| $w$ | slit width |
| $w_1$ | slit width at E |
| $w_2$ | slit width at N |

I claim:

1. A device for separating mixtures of gaseous or vaporous substances into a first fraction and a second fraction having a higher molecular weight than that of said first fraction, said device comprising, a body at least partially forming a separating chamber having walls defining an opening in the chamber, a separating means for separating the mixture into first and second fractions and comprising at least one cover member overlying the opening in the separating chamber and defining with the walls an elongated slit defining a first exit from the separating chamber, an inlet into the separating chamber through which the mixture viscously flows into the separating chamber, said first exit defining slit having a width permitting molecular flow of the first fraction therethrough, and a second exit in the body from the separating chamber and spaced from said inlet, said elongated slit extending between said inlet and second exit and having a slit width decreasing from said inlet toward said second exit.

2. The device of claim 1 wherein said opening in the separating chamber is in the form of a trough-shaped cavity forming the separating chamber, said walls of said body having upper edges defining a plane, said cover member being supported inclined to the plane forming a twofold slit having a width decreasing from said inlet towards said second exit.

3. The device of claim 1 comprising means for adjustably supporting one of said at least one cover members.

4. A device for separating mixtures of gaseous or vaporous substances into a first fraction and a second fraction having a higher molecular weight than that of said first fraction, said device comprising:
- a body at least partially forming a separating chamber having walls defining an opening in the chamber,
- a separating means for separating the mixture into first and second fractions and comprising a cover overlying the opening in the separating chamber and including first and second members defining therebetween an elongated slit defining a first exit from the separating chamber,
- an inlet into the separating chamber through which the mixture viscously flows into the separating chamber,
- said first exit defining slit having a width permitting molecular flow of the first fraction therethrough,
- and a second exit in the body from the separating chamber and spaced from said inlet,
- said elongated slit extending between said inlet and second exit and having a slit width decreasing from said inlet toward said second exit.

* * * * *